United States Patent [19]
Allen

[11] 3,733,794
[45] May 22, 1973

[54] SAFE STARTING SYSTEM FOR LAWN AND GARDEN EQUIPMENT

[75] Inventor: David Thomas Allen, Horicon, Wis.
[73] Assignee: Deere & Company, Moline, Ill.
[22] Filed: Mar. 22, 1972
[21] Appl. No.: 236,908

[52] U.S. Cl. ............... 56/10.5, 56/DIG. 15, 180/53 R
[51] Int. Cl. .............................................. A01d 75/18
[58] Field of Search ............... 56/10.2, 10.5, DIG. 15; 180/53 R, 77; 192/84

[56] References Cited

UNITED STATES PATENTS

| | | | |
|---|---|---|---|
| 3,169,358 | 5/1965 | Ertsgaard et al. | 56/10.5 |
| 3,229,452 | 1/1966 | Hasenbank | 56/10.5 |
| 3,608,285 | 9/1971 | Berk | 56/10.2 |
| 3,626,676 | 12/1971 | Miley et al. | 56/10.5 |

*Primary Examiner*—Antonio F. Guida
*Attorney*—H. Vincent Harsha, Harold M. Knoth, William A. Murray, et al.

[57] ABSTRACT

A riding mower has an internal combustion engine with a magneto type ignition system. A mower is suspended from the tractor and driven from the engine through a belt drive, which includes a clutch, while the traction wheels are driven through a different drive system, which also includes a clutch. A pair of series connected switchs are respectively connected to the clutches, so that they are open when the clutches are engaged, and closed only when the clutches are disengaged. The ignition system generates a sine wave voltage in the primary winding, the positive voltage excursion being utilized to generate the high voltage spike in the secondary winding which fires the spark plug. However, the positive voltage excursion in the primary coil can be shorted to ground through a diode and a relay, when the relay is de-energized. The relay is energized when both the safety switches are closed during the negative voltage excursion, so that the primary winding short is interrupted and the engine can be started only when both the clutches are disengaged. After the relay is energized, it completes a circuit in parallel with the safety switches, so that the clutches may be engaged once the engine is started without shorting out the primary winding.

9 Claims, 2 Drawing Figures

SAFE STARTING SYSTEM FOR LAWN AND GARDEN EQUIPMENT

BACKGROUND OF THE INVENTION

This invention relates to a system for preventing the starting of an internal combustion engine on a lawn and garden machine, such as a riding mower, a rotary tiller or the like, when one of the drives, such as the main traction drive or the drive to the working implement, is engaged.

With the increasing use of powered lawn and garden equipment, such as riding lawn mowers, lawn and garden tractors, rotary tillers, or snow blowers, there has been increased concern regarding the safety of such machines. Many of such machines utilize an internal combustion engine started with a recoil starter, and generally it is necessary for the operator to leave the controls of the machine to start the engine. If the engine is started with any of the drive clutches engaged, such as the main traction drive or the mower drive in the case of a riding lawn mower, there is an obvious safety hazard.

To overcome this, safe starting systems have been provided, which prevent the starting of the engine when said drives are engaged, two such systems being shown in U. S. Pat. Nos. 3,626,676, issued Dec. 14, 1971 to Miley et al., and 3,608,285, issued Sept. 28, 1971 to Berk, both assigned to the assignee herein.

SUMMARY OF THE INVENTION

According to the present invention, an improved safe starting system is provided for lawn and garden equipment, such as riding mowers or the like. More particularly, there is provided a safe starting system for equipment with engines having magneto type ignition systems, wherein the magneto primary is grounded to prevent starting of the engine unless one or more switches are closed, the switches being closed only when certain drives on the equipment are disengaged, thereby preventing the starting of the engine when said drives are engaged.

An important feature of the invention resides in the fact that the circuit requires a closed loop of switches to prevent shorting of the magneto primary, so that in the event of a broken connection in the safety switch loop, the engine cannot be started, thereby providing a fail safe system.

Still another feature of the invention resides in the fact that the system can be utilized on engines which fire on either the positive or negative voltage excursion of the magneto primary winding by simply reversing the polarity of the diodes utilized in the system.

DESCRIPTION OF THE PREFERRED EMBODIMENT

Figure 1:
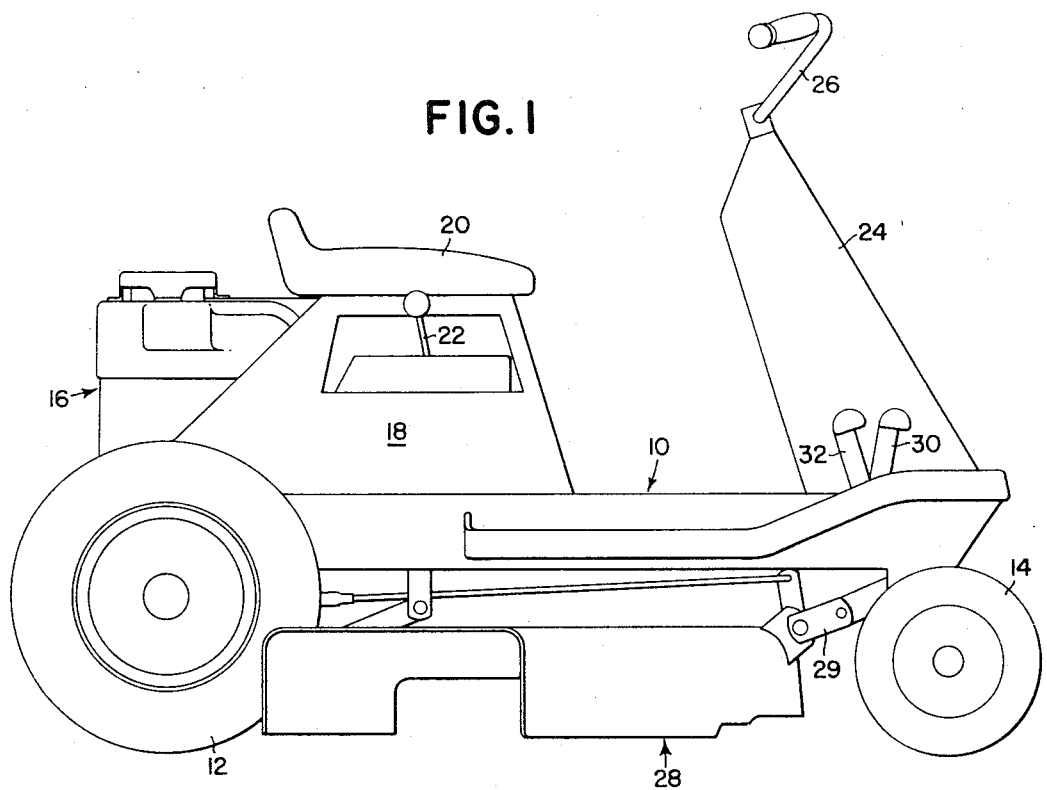
FIG. 1 is a side elevation view of a riding mower in which the invention is embodied.

The invention is embodied in a riding mower having a main frame 10 mounted on a pair of rear drive wheels 12 and steerable front wheels 14. An internal combustion engine 16 is mounted on the main frame 10 above the rear drive wheels 12 in a hood-like engine enclosure 18 partly covering the engine 16 and extending forwardly therefrom. An operator's seat 20 is mounted on top of the enclosure 18, and a transmission control lever 22 projects from the right side of the enclosure for manipulation by a seated operator. An inclined steering pedestal 24 extends upwardly and rearwardly from the front end of the main frame and supports a steering handle 26, which controls the position of the front wheels 14.

A mower unit, indicated in its entirety by the numeral 28, is suspended from the main frame between the front and rear drive wheels 12 and 14 by means of a suspension linkage 29. The mower unit 28 is of the well-known rotary type, and includes rotating horizontal blades, which are driven from the engine by a conventional belt drive (not shown). As is also well known, the drive to the mower unit is selectively engageable or disengageable by shifting a pulley, which controls the tension of the drive belt. The pulley is moved to tension the drive belt by depressing a clutch pedal 30 pivotally mounted on the main frame on the right side of the steering pedestal 24, the clutch being released or disengaged by depressing a clutch release pedal mounted adjacent to the clutch pedal 30. The above described clutching mechanism for the mower drive is described in detail in said U. S. Pat. Nos. 3,608,285 and 3,626,676.

As is also well known, a declutchable belt drive is utilized to transmit the driving torque from the engine to the propulsion transmission (not shown). The propulsion drive is disengaged by depressing a clutch pedal 34, which is shown only in FIG. 2, since it is mounted on the left side of the pedestal 24 and not visible in FIG. 1. The depression of the pedal 34 initially disengages the clutch, and further depression of the pedal actuates a braking mechanism, as also described in U. S. Pat. Nos. 3,608,285 and 3,626,676.

Figure 2:
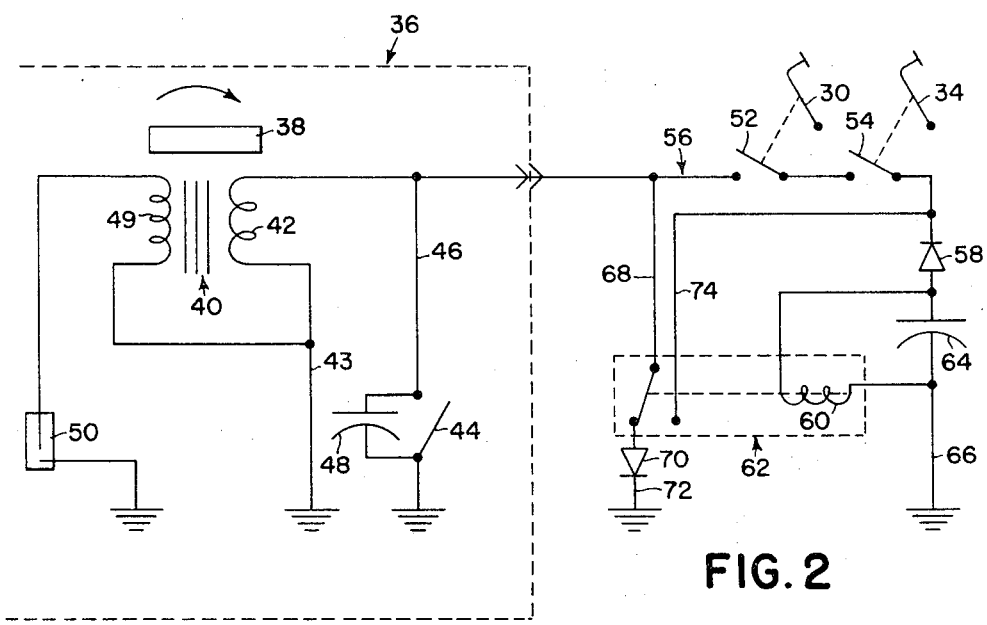
FIG. 2 is a schematic view of the safe starting system.

The engine 16 has a magneto ignition system, which is schematically illustrated in FIG. 2 and indicated by the numeral 36 in its entirety. The ignition system 36 includes a flywheel magnet 38, which rotates past a magneto coil 40 having a primary winding 42, one side of which is grounded by a lead 43. The other side of the primary winding 42 is connected to breaker points 44 by a lead 46. As is conventional, a condenser 48 is connected in parallel with the breaker points, 44 and both the points and the condenser are grounded. When the breaker points 44 open, the change of current in the primary winding 42 generates a high voltage spike in a secondary winding 49, one side of which is grounded to the lead 43 and the other side of which is connected to a spark plug 50, the high voltage spike in the secondary winding firing the spark plug. All of the above, of course, represents more-or-less conventional magneto ignition system construction.

A mower clutch switch 52 is connected to the mower clutch pedal 30, so that it is open when the mower clutch is engaged. Similarly, a drive clutch switch 54 is connected to the drive clutch pedal 34, so that it is open when the drive clutch is engaged. The relationship of the switches 30 and 34 to the mower drive and the main traction drive is also described in greater detail in U.S. Pat. Nos. 3,608,285 and 3,626,676.

The switches 52 and 54 are connected in series in a circuit 56 connected to the lead 46 between the breaker points 44 and the primary coil 42. A diode 58 and a relay coil 60 of a relay 62 are also connected in series with the switches 52 and 54 in the circuit 56. A capacitor 64 is connected in parallel with the relay coil 60 and the circuit is completed to ground via a ground lead 66.

One terminal of the relay 62 is connected to the circuit 56 between the switch 52 and the breaker point lead 46 by means of a lead 68, and the relay in its normal or de-energized condition, as shown in FIG. 2, connects the lead 68 to a diode 70, which is grounded by a lead 72. When the relay is in its closed or energized condition, it connects the lead 68 to a lead 74 connected to the circuit 56 between the diode 58 and the switch 54, completing a circuit, which bypasses the switches 52 and 54.

In operation, as the flywheel magnet 38 rotates past the coil 40, a sine wave voltage pattern is produced in the primary winding 42, and at or near the peak of the positive voltage excursion, the breaker points 44 open, and the rapid change of current in the primary winding 42 produces a high voltage spike in the secondary winding 49, which fires the spark plug 50. The negative voltage excursion in the primary winding is not used for engine ignition, but is rather used to power the safe start system. If either of the safety switches 52 or 54 are opened as the result of either the traction drive or the mower drive being engaged, and if the relay is in its normal condition, there can be no current flow through the relay coil 60 when the engine is turned, so that the relay remains in its normal or de-energized condition, as illustrated in FIG. 2, wherein it shorts the primary coil lead 46 to ground via the lead 68, the closed relay 62, the diode 70, and the ground lead 72, prevent the engine from starting. The diode 70, of course, permits only the flow of current from the primary coil to the ground.

If, however, both the drives are disengaged so that the switches 52 and 54 are closed, when the engine is turned, current passes through the relay coil 60, the diode 58, the closed switches 52 and 54, and the circuit 56 to the primary winding during the negative voltage excursion and the primary winding. The current passing through the relay coil 60 shifts the relay to its energized or closed position, wherein it disconnects the lead 68 from the diode 70 to interrupt the short of the primary winding. The diode 58, of course, prevents the shorting of the primary coil 42 to the ground during the positive voltage excursion. Thus, the engine can then be started.

After the engine is running, current flows through the relay coil 60, the diode 58, the lead 74, the energized or closed relay 62, and the lead 68 during the negative voltage excursion to maintain the relay 62 in its energized or closed condition, the capacitor 64 providing relay coil current between the voltage pulses. Thus, once the engine is started, the switches 52 and 54 are bypassed, so that the drive clutches can be engaged without shorting out the ignition system.

The above system is utilized on ignition systems which fire on the positive voltage excursion of the magneto primary winding. However, certain engines fire on the negative voltage excursion, and by reversing the polarity of the diodes 58 and 70, the system can be utilized on such systems. As is apparent, if any of the connections in the circuit 56 are broken, as the result of malfunctions in the switches 52 or 54, or some similar break in the circuit, the initial energization of the relay coil 60 cannot occur, so that the engine cannot be started, thereby providing a fail safe system.

I claim:

1. In a combination tractor and mower having a mobile main frame, an internal combustion engine mounted on the frame and having a magneto ignition system generating a sine wave voltage pattern with positive and negative voltage excursions in a primary winding producing a high voltage spike in a secondary winding during one voltage excursion, a traction drive for propelling the main frame and including a selectively engageable and disengageable clutch means, a mower carried by the main frame, and means drivingly connecting the engine to the mower and including a selectively engageable and disengageable clutch means, the improvement comprising: an electrical relay means shiftable from a normal position to a closed position when its coil is energized; a first diode operatively connected in series with the relay means and the primary winding to short the primary winding to ground during said one voltage excursion when the relay means is in its normal position; a first switch means operatively connected to and responsive to the condition of one of said clutch means so that it is open when the clutch means is engaged and closed when the clutch means is disengaged; a second diode operatively connected in series with the relay coil, the first switch means, and the primary coil for permitting a current flow through the switch means and the relay coil during the other voltage excursion when the switch means is closed to shift the relay to its closed position and thereby interrupt the short of the primary winding and permit starting of the engine only when said clutch means is disengaged; and means connecting the relay means in parallel with the switch means when the relay means is in its closed position to bypass the switch means and maintain the energization of the relay coil once the engine has started.

2. The invention defined in claim 1 and including a second switch means connected in series with the first switch means, the second diode, and the relay coil, and shiftable between open and closed positions, respectively, in response to engagement or disengagement of the other clutch means to prevent initial energization of the relay coil and the starting of the engine when either clutch is engaged, the relay being connected in parallel with the serially connected switch means when the relay is in its closed position.

3. The invention defined in claim 1 wherein the first switch means is operatively connected to and responsive to the condition of the clutch means in the mower drive.

4. The invention defined in claim 1 and including a capacitor connected in parallel with the relay coil to provide relay coil current between voltage excursions.

5. The invention defined in claim 1 wherein the first diode is operative to permit current flow from the primary winding to ground only during the positive voltage excursion and the second diode conducts only during the negative voltage excursion.

6. In a lawn and garden machine having a mobile main frame, an internal combustion engine mounted on the frame and having a magneto ignition system generating a sine wave voltage pattern with positive and negative voltage excursion in a primary winding producing a high voltage spike in a secondary winding during one voltage excursion, at least one driven element, and means drivingly connecting the engine to said driven element and including a clutch means selectively engageable and disengageable to respectively establish or disestablish said driving connection, the improvement comprising: an electrical relay means shiftable from a normal position to a closed position when its coil is energized; a first diode operatively connected in series with the relay means and the primary winding to short the primary winding to ground during said one voltage excursion when the relay means is in its normal position; a first switch means operatively connected to and responsive to the condition of the clutch means so that it is open when the clutch means is engaged and closed when the clutch means is disengaged; a second diode operatively connected in series with the relay coil, the first switch means and the primary coil for permitting a current flow through the switch means and the relay coil during the other voltage excursion when the switch means is closed to shift the relay to its closed position and thereby interrupt the short of the primary winding, and permit starting of the engine only when the clutch means is disengaged; and means connecting the relay means in parallel with the switch means when the relay means is in its closed position to bypass the switch means and maintain the energization of the relay coil once the engine is started.

7. The invention defined in claim 6 and including a capacitor connected in parallel with the relay coil.

8. The invention defined in claim 7 wherein the machine includes a second driven element connected to and driven by the engine through a second clutch means and including a second switch means connected in series with the first switch means, and the second diode, and the relay coil and shiftable between open and closed positions, respectively, in response to engagement or disengagement of the second clutch means to prevent initial energization of the relay coil and the starting of the engine when either clutch is engaged, the relay being connected in parallel with the serially connected switch means when the relay is in its closed position.

9. The invention defined in claim 6 wherein the first diode is operative to permit current flow from the primary winding to ground only, during the positive voltage excursion, and the second diode conducts only during the negative voltage excursion.

* * * * *